United States Patent

[11] 3,601,691

| [72] | Inventor | Robert F. Gardiner<br>4729 N. 7th Ave., Phoenix, Ariz. 85013 |
|---|---|---|
| [21] | Appl. No. | 864,946 |
| [22] | Filed | Sept. 29, 1969 |
| [45] | Patented | Aug. 24, 1971<br>Continuation-in-part of application Ser. No. 682,764, Nov. 14, 1967, now abandoned. |

[54] METAL DETECTOR RESPONSIVE TO SMALL METALLIC OBJECTS FOR DIFFERENTIATING BETWEEN FERROUS AND NONFERROUS OBJECTS
1 Claim, 3 Drawing Figs.

| [52] | U.S. Cl. | 324/3, 324/41 |
|---|---|---|
| [51] | Int. Cl. | G01v 3/00 |
| [50] | Field of Search | 324/41, 3 |

[56] References Cited
UNITED STATES PATENTS

| 3,344,346 | 9/1967 | Halsey | 324/41 |
|---|---|---|---|
| 3,135,914 | 6/1964 | Callan et al. | 324/40 |

OTHER REFERENCES

Kaufman; A., The Modern Divining Rod; Radio News, April, 1947; pp. 41– 43 and 122, 124 and 126 (Copy in 324-41).

Charles; T.; The Asdet; ASEA Journal; Vol. 31, No. 7; 1958, pp. 98– 105 (Copy in 324-41).

*Primary Examiner*—Rudolph V. Rolinec
*Assistant Examiner*—R. J. Corcoran
*Attorney*—Drummond, Cahill and Phillips ABSTRACT: A metal detector utilizing a Hartley oscillator having a field effect transistor therein. The output of the oscillator is connected through a series of amplifying transistor circuits to a meter. The oscillator is adjusted with sufficient Q to just oscillate; the detection of certain metals results in a change in the Q to result in a substantial decrease in the amplitude of oscillations indicated by the meter connected to the circuit.

PATENTED AUG 24 1971
3,601,691
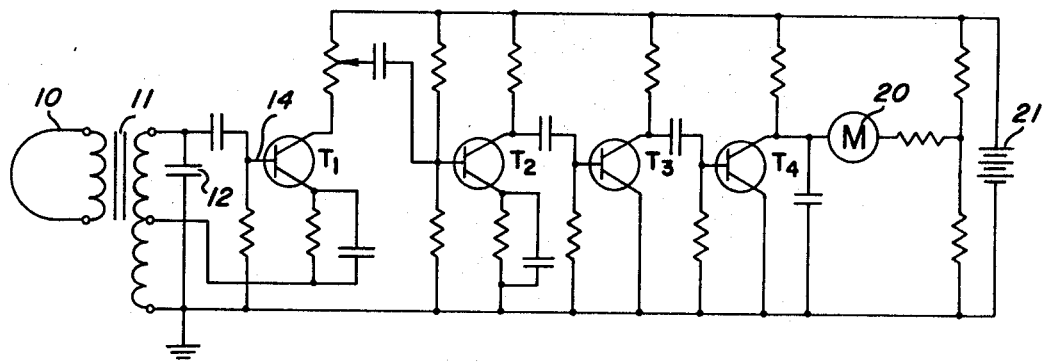
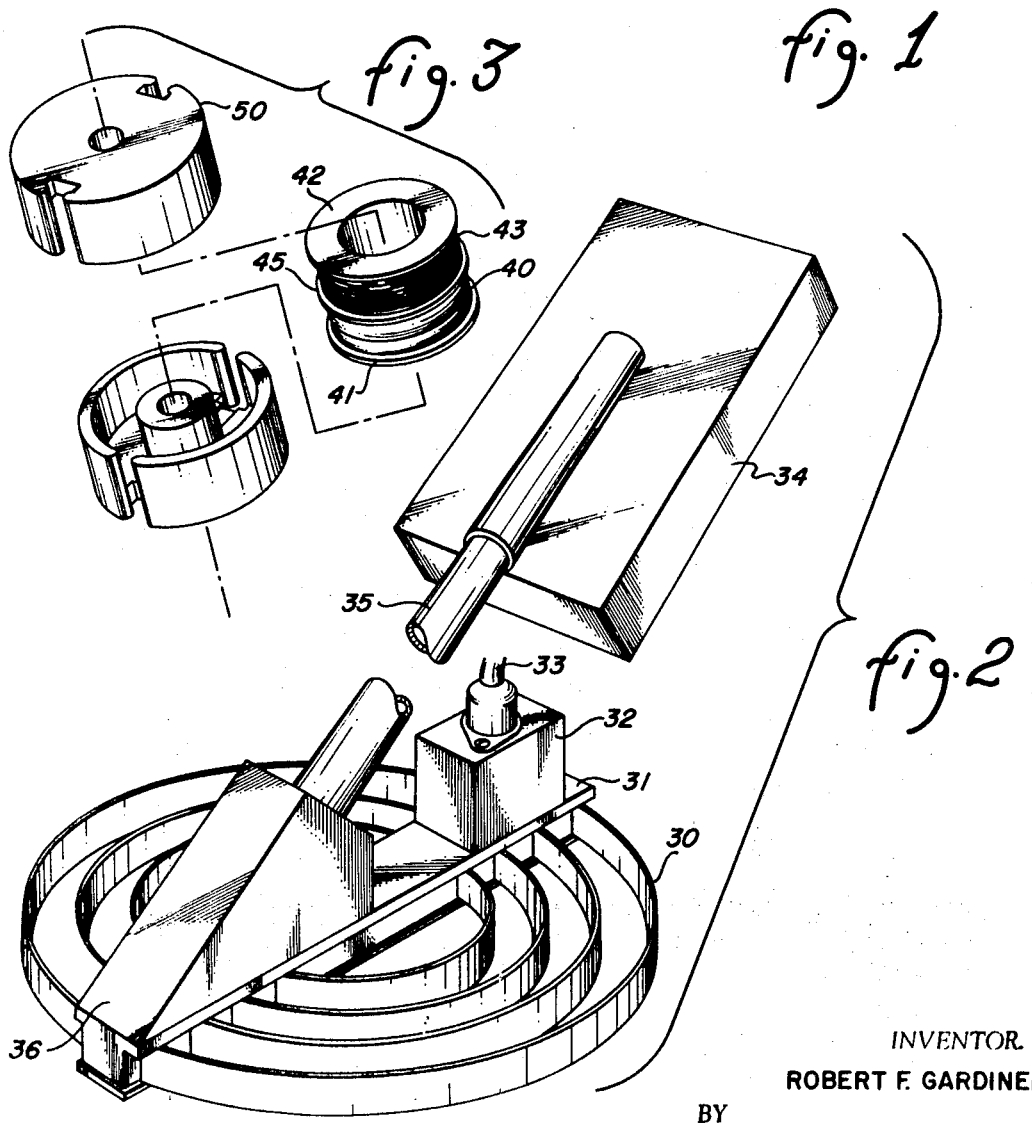
INVENTOR.
ROBERT F. GARDINER
BY
Drummond & Cahill
ATTORNEYS

METAL DETECTOR RESPONSIVE TO SMALL METALLIC OBJECTS FOR DIFFERENTIATING BETWEEN FERROUS AND NONFERROUS OBJECTS

The present invention is a continuation-in-part of Pat. application Ser. No. 682,764, filed Nov. 14, 1967, and now abandoned.

The present invention pertains to metal detectors, and more specifically, to a metal detector capable of distinguishing between small metallic iron objects and nonferrous metal objects.

The utilization of metal detectors to search and find metal objects is an old and well developed art. However, difficulties have been experienced by the prior art in distinguishing between ferrous and nonferrous objects; the latter is particularly true when it is desired to distinguish between small metallic iron objects such as bottle caps and the like from small nonferrous metal objects, such as gold or silver coins. Attempts to provide the necessary circuitry to distinguish between the types of metal objects has inevitably led to complicated circuitry requiring great care and skill in the adjustment of same and requiring considerably continuous calibration.

Another difficulty experienced with metal detectors is the resulting offset of calibration when so-called black magnetic sand is encountered. This sand, which to be more technically precise, is ferric oxide ($Fe_3O_4$) causes the background of the metal detector to so be changed as to require recalibration to counter the effect of the magnetic sand. Since the purity, quantity and extent of magnetic sand varies substantially from one location to the next, an operator utilizing a prior art metal detector is confronted with the difficulty of continuously readjusting and recalibrating his detector as he walks over the ground.

It is therefore an object of the present invention to provide a metal detector capable of distinguishing between small metallic iron objects and nonferrous metal objects.

It is another object of the present invention to provide a metal detector capable of satisfactorily operating without readjustment when searching in areas containing magnetic sand.

It is still another object of the present invention to provide a metal detector that operates solely on the utilization of the variation in Q without also requiring more than a single frequency of utilization.

It is still another object of the present invention to provide a metal detector operating at extremely low frequency to enable the utilization of detection by the variation in Q without the necessity of arriving at the frequency through beat frequency techniques.

These and other objects of the present invention will become apparent to those skilled in the art as the description thereof proceeds.

Briefly, in accordance with the embodiment chosen for illustration, a metal detector is constructed utilizing a search coil coupled into the resonant tank of a Hartley oscillator. The Hartley oscillator is connected to the control electrode of a high input impedance amplifying device such as a field effect transistor. The Q of the circuit is selected to barely be sufficient to maintain oscillations; further, the frequency is chosen to be less than 5000 Hz. The output of the field effect transistor is coupled through subsequent transistor amplifying stages and is ultimately applied to a meter to indicate the amplitude of oscillations provided by the tank circuit. The detection of certain types of metals, to be described more fully hereinafter, results in substantial lowering of the Q of the Hartley oscillator which, in turn, results in the substantial lowering of the amplitude of oscillation. The reduced amplitude is indicated by the meter to provide the operator with the information regarding the object detected.

The present invention may more readily be described by reference to the accompanying drawings, in which:

FIG. 1 is a circuit diagram of a metal detector constructed in accordance with the teachings of the present invention.

FIG. 2 is a perspective view of a search coil, mounting bracket, and related equipment pictorially representing the metal detector of the present invention.

FIG. 3 is an exploded perspective view of the transformer utilized in the circuit of FIG. 1.

Referring now to the drawings, a search coil 10 is coupled through a transformer 11 into a tank circuit including the capacitor 12. It may be noted that the search coil 10 forms a part of the inductance of the parallel tuned circuit. The output of the tuned circuit, which may be recognized as the conventional Hartley oscillator is connected to the control electrode 14 of field effect transistor $T_1$. The Q of the circuit of the Hartley oscillator is chosen so that the oscillator barely oscillates and any reduction in the Q results in a substantial reduction in the amplitude of oscillations provided by the tank circuit. Conventional junction transistors $T_2$, $T_3$, and $T_4$ will be recognized as simply amplifying circuits to amplify the oscillations provided at the output of the field effect transistor $T_1$. A meter 20 is connected to the output of transistor $T_4$ to register the relative amplitude of oscillations provided by the Hartley oscillator. A power source indicated in FIG. 1 at 21 is appropriately connected to the circuit to provide biasing potentials for the various transistors. Referring now to FIG. 2, it may be seen that to achieve the necessary frequency range of operation as well as to provide the Q values desired, it is necessary to depart from the usual construction of search coil and search coil coupling. The search coil in FIG. 2 is shown at 30 and comprises a spirally wound strip of aluminum supported by an insolating mounting frame 31. The frame also supports a transformer housing 32 which is connected through a conductor 33 to a control box 34 containing the circuit of FIG. 1. A handle 35 is appropriately secured to a supporting structure 36 to enable the search coil to be supported above the ground.

Referring now to FIG. 3, the transformer 11 of FIG. 1, contained in the box 32 of FIG. 2, is shown in greater detail. The spiral wound search coil is connected to the primary winding 40 which is wound on a spool 41 of a two-spool cup core. The second spool 42 is provided with several turns of copper wire 43 forming the secondary of the transformer. A split cup core 50 is provided, the halves of which are separated by a spacer 45 to provide better stability and to militate against self-modulation. The spools 41 and 42 are inserted into the split cup core 50 of suitable transformer metal and mounted in the enclosure shown at 32 in FIG. 2.

The operation of the system of the present invention may be described as follows. The Hartley oscillator oscillates at a frequency less than 5000 Hz. per second. When diamagnetic material is placed in the vicinity of the search coil, the metal, such as gold or silver coins, causes increased $I_2R$ or eddy current losses, and decreases the inductance of the circuit. As a result, the Q of the circuit is decreased and the oscillation amplitude is substantially decreased. Since the circuit was originally adjusted having a Q sufficient only to sustain oscillation, the decrease in Q results in a decrease in the amplitude of oscillation. This reduced amplitude will be indicated by the meter 20 to provide the operator with an indication that a diamagnetic object has been detected. When a metal object such as a bottle cap or nail is placed in the vicinity of the search coil, both the $I^2R$ loss and the inductance are increased; however, the inductance is increased proportionally greater than the $I^2R$ increase resulting in an increase in the amplitude of oscillations. Therefore, the meter 20 will indicate a change in amplitude to provide the operator with an indication that a ferrous metal object has been detected. If the meter 20 is adjusted to read zero at midscale, it may be seen that the deflection of any needle thereof will indicate by its direction the type of metal object that has been found.

A very important phenomena provided by the present invention is the ability of the system to ignore the herebefore disastrous results when searching in areas containing average amounts of black magnetic sand. When the search coil of the present invention is placed in the vicinity of $Fe_3O_4$, the inductance of the circuit is increased which would normally result in an increased Q, however, the increased inductance tends to decrease the frequency which, in turn, tends to decrease the Q. Therefore, the factors tending to increase and decrease the Q of the circuit as a result of the detection of ferric oxide cancel each other and no detectable change in circuit reading occurs, and the amplitude indicated by the meter 20 remains unchanged. It may be noted that the operation is based solely on changes in Q and not in frequencies and operates at only a single frequency.

It has been found that frequencies less than 5000 cycles per second are desirable and that frequencies in the range of 1000 to 3500, notably 2000, provide the best operation. For best results, it has also been found that the inductance of the circuit by approximately 70 millihenrys with a Q around 3; transistor $T_1$ should have a transconductance of 600 or more. To achieve the necessary high inductance and Q, it has been found that an aluminum strip having a cross section of one-half inch by 0.05 inch and having a length of 90 inches spiraled from an outside diameter of 11 inches to an inside diameter of 3½ inches is suitable. This aluminum strip is connected to approximately 2 turns of number 14 wire. Approximately 350 turns are utilized on the second spool of the cup core and a 1 mil spacer is inserted between the spools to provide better temperature stability and prevent self-modulation.

The system of the present invention provides a means whereby detection of both ferrous and nonferrous metals is possible while distinguishing between the two and nevertheless ignoring the effects of so-called black magnetic sand. It will be apparent to those skilled in the art that numerous modifications may be made in various details described in connection with the chosen embodiment, and it is therefore intended that the present invention be limited only by the scope of the claims appended hereto.

1. Metal detecting and differentiating apparatus comprising: a search coil mounted for carrying over the ground in close proximity thereto by an operator for detecting metallic objects; a split cup core having first and second core halves; an insulating spacer positioned between said core halves; a preliminary winding mounted on said second split cup core half and connected to form a parallel resonant tank circuit; a high input impedance amplifying device connected to said resonant tank to form a Hartley oscillator having a predetermined nonvariable oscillating frequency of less than 5000 cycles per second; said resonant circuit having a low Q sufficient to sustain oscillations but sensitive to further lowering of said Q for lowering the amplitude of oscillations and sensitive to an increase in said Q for increasing said amplitude; said coil and tank circuit responsive to the detection of a diamagnetic object for decreasing the Q of said circuit and responsive to the detection of a ferromagnetic object for increasing the Q of said circuit; a meter for indicating the amplitude of oscillations; and means connecting the output of said Hartley oscillator to said meter through an amplifier.